(12) United States Patent
Klenk et al.

(10) Patent No.: US 11,315,715 B2
(45) Date of Patent: Apr. 26, 2022

(54) ELECTROMAGNETIC ACTUATOR

(71) Applicant: Robert Bosch GmbH, Stuttgart (DE)

(72) Inventors: Alexander Klenk, Markgroeningen (DE); Klaus Schudt, Nordheim (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 16/342,660

(22) PCT Filed: Aug. 28, 2017

(86) PCT No.: PCT/EP2017/071566
§ 371 (c)(1),
(2) Date: Apr. 17, 2019

(87) PCT Pub. No.: WO2018/072916
PCT Pub. Date: Apr. 26, 2018

(65) Prior Publication Data
US 2019/0244738 A1      Aug. 8, 2019

(30) Foreign Application Priority Data

Oct. 21, 2016   (DE) .......................... 102016220767.9

(51) Int. Cl.
*H01F 7/127* (2006.01)
*H01F 7/08* (2006.01)
*H01F 7/16* (2006.01)

(52) U.S. Cl.
CPC ............. *H01F 7/127* (2013.01); *H01F 7/081* (2013.01); *H01F 7/1607* (2013.01)

(58) Field of Classification Search
CPC ......... H01F 7/081; H01F 7/127; H01F 7/1607
See application file for complete search history.

(56) References Cited

U.S. PATENT DOCUMENTS

| 4,552,311 | A  | † | 11/1985 | Casey |
| 8,109,487 | B2 | * | 2/2012  | Kokubu ................. H01F 7/081 |
|           |    |   |         |  251/129.15 |
| 2006/0011245 | A1 | † | 1/2006 | Suzuki |
| 2014/0166915 | A1 |   | 6/2014 | Ishibashi et al. |
| 2014/0361206 | A1 | † | 12/2014 | Holmes |

(Continued)

FOREIGN PATENT DOCUMENTS

| CN | 101288136 A | 10/2008 |
| CN | 105317495 A | 2/2016 |

(Continued)

OTHER PUBLICATIONS

International Search Report for PCT/EP2017/071566, dated Nov. 17, 2017.

*Primary Examiner* — Eric Keasel
(74) *Attorney, Agent, or Firm* — Norton Rose Fulbright US LLP; Gerard Messina

(57) ABSTRACT

An electromagnetic actuator including an armature movable along a longitudinal axis in an armature chamber, a coil running around the longitudinal axis for producing a magnetic field for moving the armature, a control element motionally coupled to the armature, in particular for operating a valve element of a pressure-regulating valve, a pole disk for conducting a magnetic flux, and a cover bounding the armature chamber, the cover and the pole disk together forming a component in one piece.

13 Claims, 4 Drawing Sheets

(56) References Cited

U.S. PATENT DOCUMENTS

2015/0144820 A1\* 5/2015 Mills .................... F16K 27/048
251/129.19
2015/0380143 A1 12/2015 Saiki et al.

FOREIGN PATENT DOCUMENTS

| DE | 102008044237 A1 | 6/2010 |
| DE | 102012223430 A1 | 6/2014 |
| EP | 3007188 A1 | 4/2016 |
| JP | 2008196597 A | 8/2008 |

\* cited by examiner
† cited by third party

ELECTROMAGNETIC ACTUATOR

FIELD

The present invention relates to an electromagnetic actuator.

BACKGROUND INFORMATION

In modern automatic transmissions for motor vehicles, hydraulically operated clutches are used for changing gears. In order for these shifting operations to proceed smoothly and imperceptibly for the driver, it is necessary to adjust the hydraulic pressure on the clutches in accordance with pre-defined pressure ramps with the highest precision in terms of pressure. The pressure required for this purpose is regularly provided with the aid of hydraulic pressure-regulating valves. These pressure-regulating valves may be operated in particular via an electromagnetic actuator. Examples for electromagnetic actuators are described in German Patent Application Nos. DE 10 2012 223 430 A1 and in DE 10 2008 044 237 A1.

SUMMARY

An of the present invention may be attained by an electromagnetic actuator in accordance with the present invention. Advantageous refinements are described herein. Features for the present invention are described below and are shown in the figures. The features may be important for the present invention both by themselves and also in different combinations, without any further explicit reference being made in this regard.

The present invention has the advantage of making it possible to save material and costs by the fact that the cover includes the pole disk and yet is formed in one piece. Cost savings are here achieved by reducing investments in production facilities and in particular by the fact that it is possible to fasten the cover including the pole disk to the actuator in one single work step. Advantageously there is also a functional integration since the function of the pole disk, namely, to allow for the magnetic flux and thus to close the magnetic circuit, as well as the function of the cover, namely, in particular the axial bounding of the armature chamber, are realized by one single component. Nevertheless, a flexible attachment of the cover on an actuator housing in particular and a flexible arrangement of an electrical connection for the coil on the cover are made possible.

In one development of the present invention, the cover is designed to be cup-shaped having a cover jacket and a cover bottom, the cover jacket and/or the cover bottom abutting against a pole tube bounding the armature chamber. The pole tube consequently bounds the armature chamber in the radial direction, that is, perpendicular to the longitudinal axis, while the cover bounds the armature chamber on an axial end face. The pole tube is here used one the one hand to support and guide the armature, while on the other hand the magnetic flux producible by the coil is also conducted through the pole tube.

In this connection, it is possible in particular that either only the cover jacket abuts radially against the pole tube, or that both the cover jacket as well as the cover bottom abut against the pole tube radially and axially. Magnetic transitions are formed on the radial and/or axial transition from the pole tube to the cover so that a magnetic flux is made possible from the pole tube into the cover having or forming the pole disk for forming a magnetic circuit. The greater the magnetic flux transition surfaces, the higher will be the magnetic efficiency. A nearly air gap-free axial transition surface may be produced in particular when the cover abuts radially and axially against the pole tube, which results in an increased magnetic efficiency.

In another development of the present invention, the pole tube has a first section surrounded by the coil and a second section surrounded by the cover jacket, the outer diameter of the second section being 10% to 30%, in particular 20%, greater than the outer diameter of the first section. This makes it possible to form large radial magnetic flux transition surfaces without excessively increasing the machining volume on the pole tube. This furthermore ensures that sufficient free space is available on the cover for plug clearances for situating an electrical plug connector for connecting the coil electrically.

It is furthermore possible in accordance with the present invention that the cover bottom has at least one projection developed as an armature stop. In particular, it is possible for there to be multiple projections. This makes it possible in particular to prevent so-called magnetic adhesion of the armature on the cover since the contact surface to the cover, when the armature contacts the cover, is comparatively small and the development of the projection creates a gap between the armature and the cover bottom.

In this instance, the cover jacket and/or the cover bottom may have at least one groove for venting the armature chamber. It is in particular possible that at least one groove is provided that extends across the cover bottom and the cover jacket.

Consequently, in spite of the integration of the pole disk into the cover, it is possible to provide venting of the armature chamber or it is possible to convey hydraulic fluid out of or into the armature chamber.

It is furthermore possible in accordance with the present invention that the cover bottom is spaced apart from the pole tube. This makes it in particular possible to ensure that an axial fastening force has no detrimental effect on a V-groove possibly provided in the pole tube. In pole tubes made of one piece, such a V-shaped groove is implemented in order to produce a magnetic separation.

In this connection, there may be a provision in particular to provide a flux disk bounding the armature chamber on the side of the pole tube facing away from the cover, which flux disk is firmly attached to the pole tube, in particular crimped or press-fitted. A flux disk may be provided in particular on the axial end of the armature chamber opposite from the pole disk and may likewise serve to conduct the magnetic flux and thus to provide a magnetic circuit.

In particular if the cover bottom is to be spaced apart from the pole tube, it is advantageously possible to ensure this spacing by attaching the pole tube firmly to the flux disk.

In this connection it is possible in accordance with the present invention for the cover jacket to have at least one projection on the outside, the projection resting on an actuator housing. This makes it possible to ensure that an axial spacing is provided between the cover bottom and the pole tube when the projections make contact with the actuator housing.

It is additionally provided for the cover to comprise a clearance for situating an electrical plug connector for supplying current to the coil. The clearance may be formed in particular as a circular segment so that in an otherwise circular cover a circular segment is cut out so that an electrical plug connector may be passed through it or be situated on it.

It is furthermore possible in accordance with the present invention that the cover is produced, in particular sintered, in powder-metallurgical fashion. This makes it possible to use materials having favorable magnetic properties. Furthermore, in particularly simple and cost-effective fashion, this makes it possible to produce on the cover grooves or stop areas for the armature or a clearance for a plug connector passage with little expenditure in time and costs.

It is particularly possible in accordance with the present invention to provide a presently proposed actuator in a pressure-regulating valve, a valve element being operable by the actuator for conducting and pressure-regulating a work medium such as oil, for example. Such a pressure-regulating valve may be used in particular in an automatic passenger car transmission for the hydraulic operation of clutches for changing the gears.

Further features, uses and advantages of the present invention derive from the following description of exemplary embodiments of the present invention, which are explained with reference to the figures.

BRIEF DESCRIPTION OF THE DRAWINGS

Functionally equivalent elements and areas have the same reference numerals in the subsequent figures and are not explained again in detail.

DETAILED DESCRIPTION OF EXAMPLE EMBODIMENTS

Figure 1:
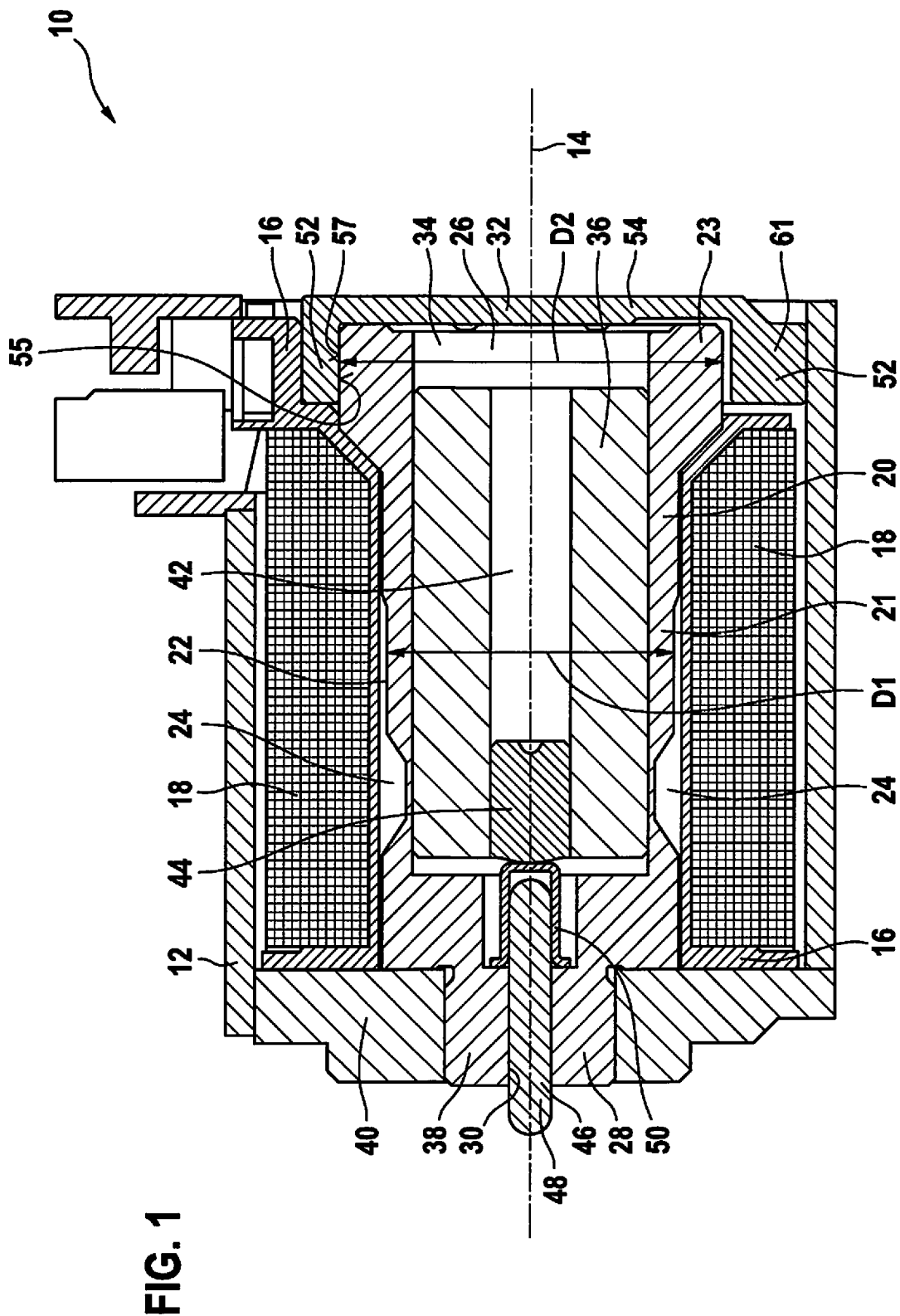
FIG. 1 shows a longitudinal section through an electromagnetic actuator according to a first specific embodiment.

In FIG. 1, an electromagnetic actuator for a pressure-regulating valve that is not specifically referenced bears as a whole the reference numeral 10. Actuator 10 comprises an essentially tubular housing 12, which may be produced in particular from a rolled and linked sheet metal component. Housing 12 runs essentially in rotationally symmetric fashion around a longitudinal axis 14. A coil form 16 bearing a magnetic coil 18 is situated in housing 12 likewise in rotationally symmetric fashion around longitudinal axis 14. Magnetic coil 18 is able to be supplied with current via a current connection that is not shown. A pole tube 20 is provided within coil form 16. Pole tube 20 has a first cylindrical section 21 surrounded by coil 18 and a second section 23 provided on the right end area of FIG. 1. First section 21 has an outer diameter D1, while second section 23 has an outer diameter D2, D2 being approximately 20% greater than D1. Pole tube 20 has an overall approximately V-shaped clearance 24 on its outer circumference 22 in the area of section 21.

Clearance 24 is to that extent developed as a V-groove and acts to prevent a magnetic short circuit. In addition, pole tube 20 has a cylindrical stepped inner clearance 26. The latter runs from the right end of the pole tube shown in FIG. 1 to a magnetic yoke 28 provided in the left end area, which surrounds a through hole 30. The inner clearance 26 is bounded on a first axial end by yoke 28, in the radial direction by pole tube 20 and on a second axial end by a cover 32. The cylindrical clearance 26 forms an armature chamber 34, in which an armature 36 is supported so as to be able to slide. A bolt 44 is pressed into a central clearance 42 of armature 36. When the armature is moved into the direction of yoke 28, then bolt 44 makes contact with control element 46 of actuator 10. Control element 46 is made from two parts and comprises a tappet 48 running through through opening 30 and a separating piece 50 pressed onto it, with which bolt 44 is able to make contact. Control element 46 may be designed in particular for operating a valve element (not shown) of a pressure-regulating valve. An annular flux disk 40 is fitted onto a circular-cylindrical free end 38 of yoke 28 that is formed as a protrusion. Flux disk 40 is designed to conduct a magnetic flux produced by magnetic coil 18.

Figure 2:
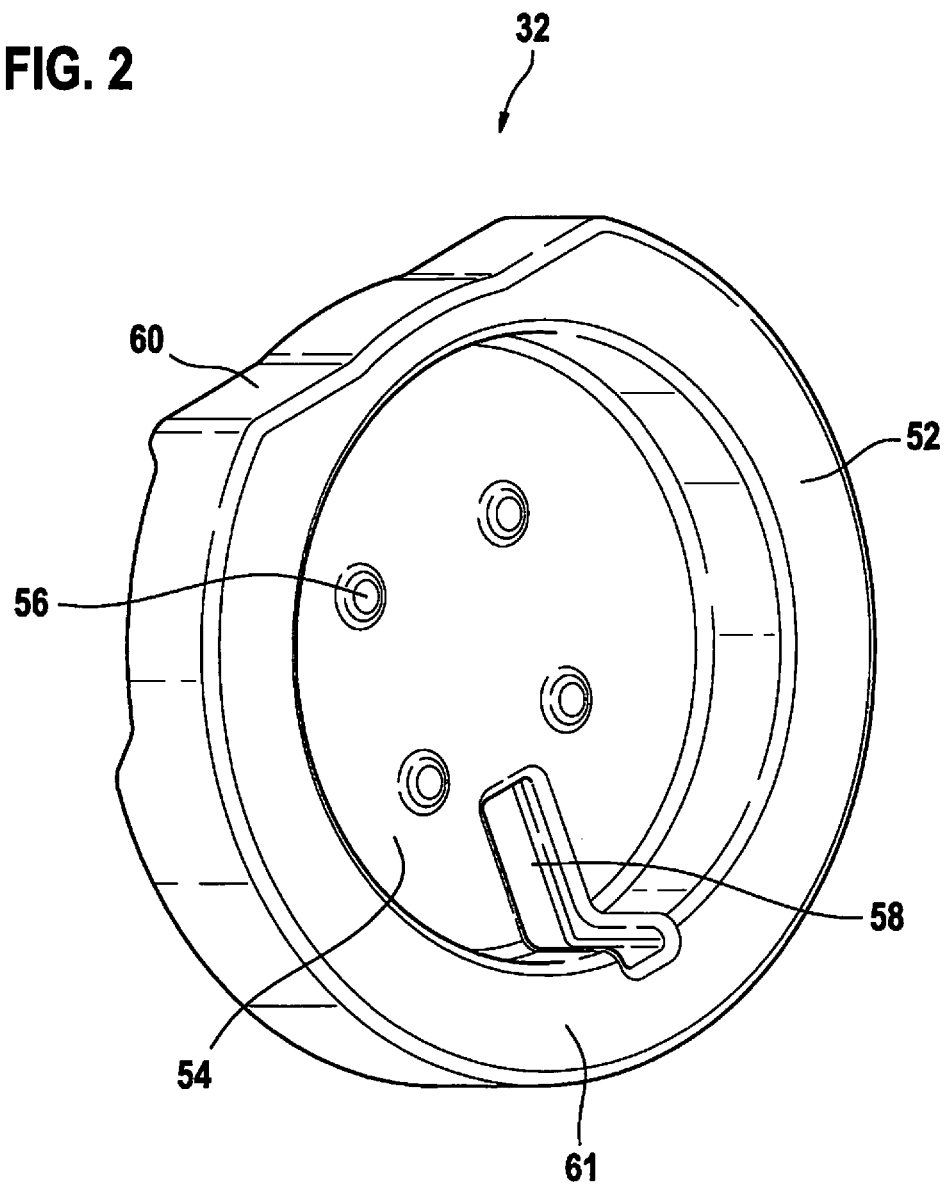
FIG. 2 shows a perspective representation of the cover of the actuator according to FIG. 1.

As is shown in FIG. 2, cover 32 is designed in cup-shaped fashion having a cover jacket 52 and a cover bottom 54. According to FIG. 1, the inner circumferential surface 55 of cover jacket 52 abuts on outer circumferential surface 57 of the second section 23 of pole tube 20. Furthermore, cover bottom 54 abuts axially on the second section 23 of pole tube 20. This makes it possible to provide a particularly large magnetic flux transition surface. Cover bottom 54 has a number of projections for forming armature stops 56. Furthermore, a venting groove 58 is provided in cover 32, which extends from cover bottom 54 across cover jacket 52. A circular segment is cut out from the otherwise circular-cylindrical cover 32 to form a clearance for an electrical plug connector so that a section 60 of cover jacket 52 is formed as a straight line.

Actuator 10 then functions as follows: When a current is applied on magnetic coil 18, this results in a magnetic flux, a magnetic circuit being formed between pole tube 20, flux disk 40 and cover 32. Cover 32 is consequently magnetic at least in certain sections and thus forms a pole disk 61. The magnetic flux through the magnetic circuit results in a magnetic force on armature 36, which is thereby shifted along longitudinal axis 14 as a function of the current applied on coil 18. Due to the motional coupling with control element 46, the latter is likewise moved in the axial direction along longitudinal axis 14.

Figure 3:
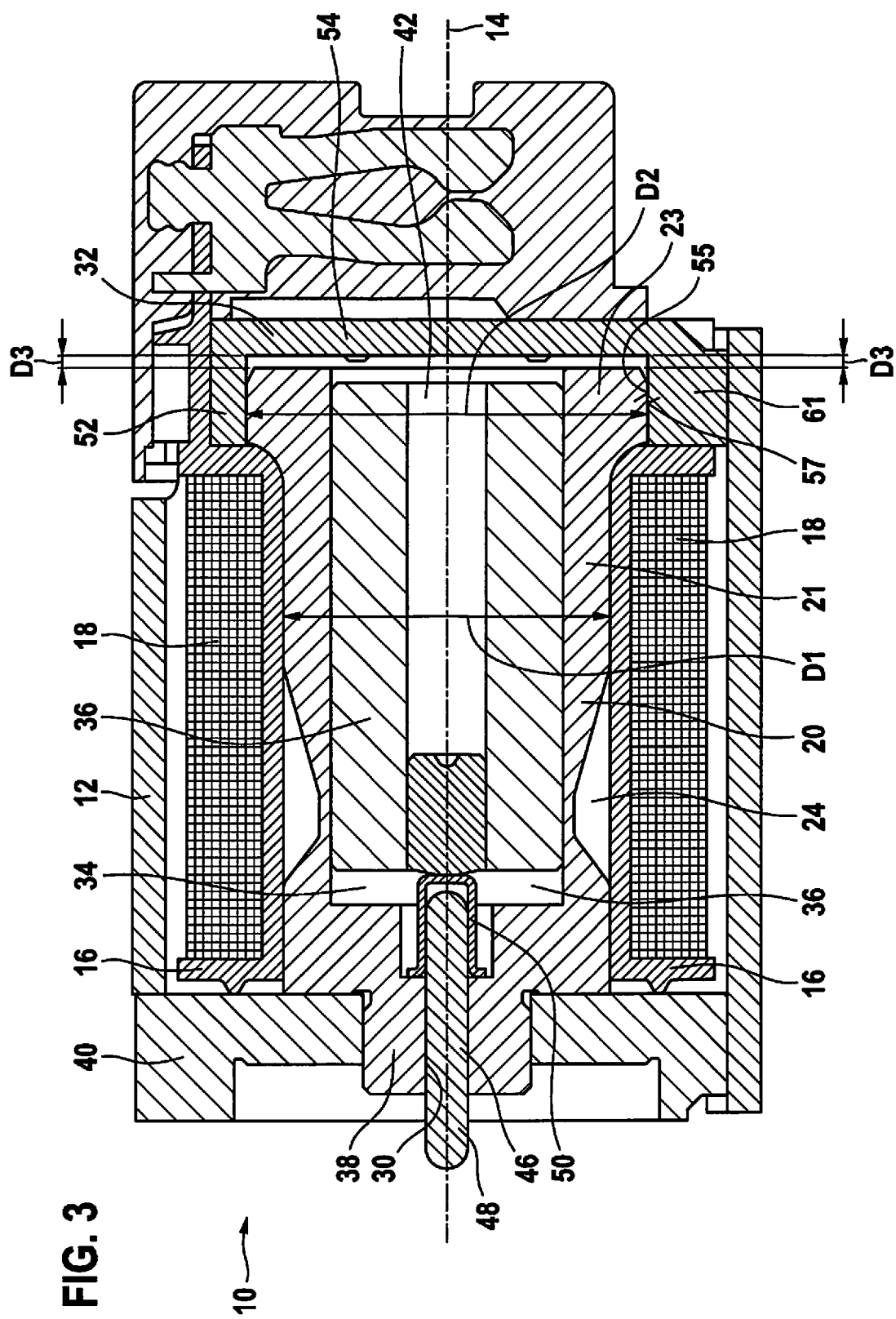
FIG. 3 shows a longitudinal section through an electromagnetic actuator according to a second specific embodiment.
Figure 4:
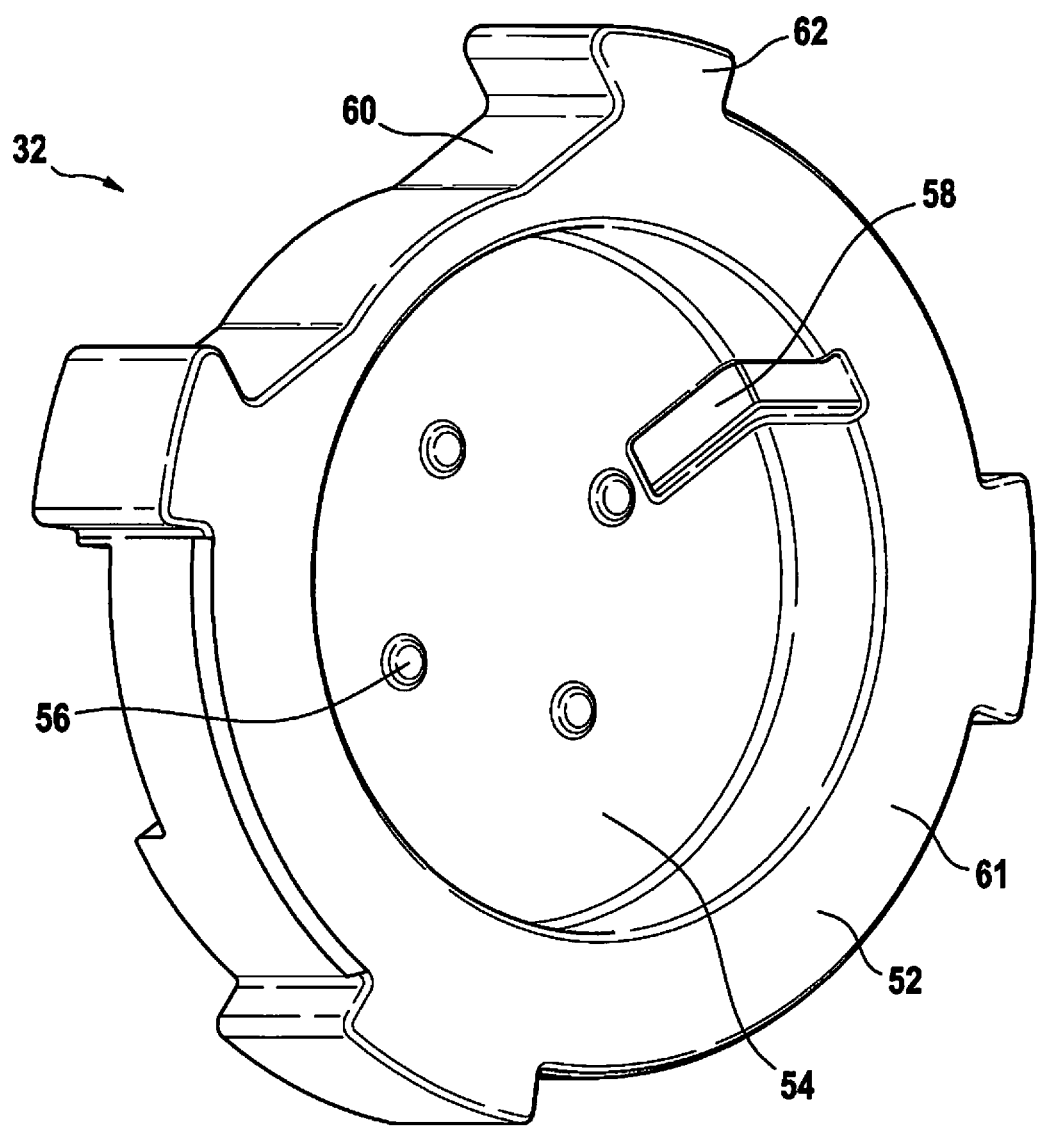
FIG. 4 shows a perspective representation of the cover of the actuator according to FIG. 3.

In contrast to the specific embodiment shown in FIGS. 1 and 2, in FIG. 3 the inner circumferential surface 55 of cover jacket 52 indeed abuts on outer circumferential surface 57 of second section 23 of pole tube 20. In the axial direction along longitudinal axis 14, however, cover bottom 54 is spaced apart from pole tube 20 by a distance D3. This indeed reduces the magnetic flux transition surface. It ensures, however, that no detrimental influence is exerted on the V-shaped clearance 24 of pole tube 20 by an axial fastening force of cover 32. In order to ensure the axial spacing, pole tube 20 is firmly connected, for example crimped or press-fitted, to flux disk 40. Cover 32 furthermore rests on housing 12 in that a number of projections (see FIG. 4) are provided on the outer circumference of cover jacket 52, which may have a tab-shaped design and are in particular insertible into complementary clearances in the housing. The sides of projections 62 facing the housing consequently act as stop faces for abutting on complementary stop faces of housing 12 so as to ensure a spacing between cover 32 and pole tube 20.

What is claimed is:
1. An electromagnetic actuator, comprising:
   an armature movable along a longitudinal axis in an armature chamber;
   a coil running around the longitudinal axis for producing a magnetic field for moving the armature;

a control element motionally coupled to the armature for operating a valve element of a pressure-regulating valve;
a pole disk for conducting a magnetic flux; and
a cover bounding the armature chamber;
wherein the cover and the pole disk together form a component made of one piece,
wherein a pole tube has a first section surrounded by the coil and a second section surrounded by a cover jacket, an outer diameter of the second section being 10% to 30% greater than an outer diameter of the first section, and
wherein the pole tube has a cylindrical inner clearance, the cylindrical clearance forms an armature chamber, in which an armature is supported so as to be able to slide wherein the inner clearance is bounded on a first axial end by a yoke formed in one piece with the pole tube, in the radial direction by pole tube and on a second axial end by the cover, and
wherein the pole tube has a trapezoidal-shaped clearance or trapezoidal-shaped groove on an outer circumference of the pole tube in the area adjacent to the first section to prevent a magnetic short circuit, and
wherein the cover is cup-shaped having a cover jacket and a cover bottom, wherein an inner circumferential surface of the cover jacket abuts on an outer circumferential surface of the second section of the pole tube.

2. The electromagnetic actuator as recited in claim 1, wherein the cover jacket and/or the cover bottom abut against the pole tube bounding the armature chamber.

3. The electromagnetic actuator as recited in claim 2, wherein the outer diameter of the second section is 20% greater than an outer diameter of the first section.

4. The electromagnetic actuator as recited in claim 2, wherein the cover bottom has at least one projection forming at least one armature stop.

5. The electromagnetic actuator as recited in claim 2, wherein the cover jacket and/or the cover bottom has at least one groove for venting the armature chamber.

6. The electromagnetic actuator as recited in claim 2, wherein the cover bottom is spaced apart from the pole tube.

7. The electromagnetic actuator as recited in claim 2, wherein a flux disk bounding the armature chamber is provided on the side of the pole tube facing away from the cover, the flux disk being firmly attached to the pole tube.

8. The electromagnetic actuator as recited in claim 7, wherein the flux disk is crimped or press-fitted to the pole tube.

9. The electromagnetic actuator as recited in claim 2, wherein the cover jacket has the projections on an outside of the cover jacket, the projections resting on an actuator housing.

10. The electromagnetic actuator as recited in claim 2, wherein the cover has a clearance for situating an electrical plug connector for supplying current to the coil and/or the cover is produced in a powder-metallurgical manner.

11. The electromagnetic actuator as recited in claim 2, wherein the cover is sintered in a powder-metallurgical manner.

12. A pressure-regulating valve having a valve element, comprising:
an electromagnetic actuator including an armature movable along a longitudinal axis in an armature chamber, a coil running around the longitudinal axis for producing a magnetic field for moving the armature, a control element motionally coupled to the armature for operating the valve element, a pole disk for conducting a magnetic flux, and a cover bounding the armature chamber, wherein the cover and the pole disk together form a component made of one piece;
wherein the valve element is operable by the control element for conducting and pressure- regulating a work medium,
wherein a pole tube has a first section surrounded by the coil and a second section surrounded by a cover jacket, an outer diameter of the second section being 10% to 30% greater than an outer diameter of the first section, and
wherein the pole tube has a cylindrical inner clearance, the cylindrical clearance forms an armature chamber, in which an armature is supported so as to be able to slide wherein the inner clearance is bounded on a first axial end by a yoke formed in one piece with the pole tube, in the radial direction by pole tube and on a second axial end by the cover, and
wherein the pole tube has a trapezoidal-shaped clearance or trapezoidal-shaped groove on an outer circumference of the pole tube in the area adjacent to the first section to prevent a magnetic short circuit, and
wherein the cover is cup-shaped having a cover jacket and a cover bottom, wherein an. inner circumferential surface of the cover jacket abuts on an outer circumferential surface of the second section of the pole tube.

13. The pressure-regulating valve as recited in claim 12, wherein the work medium is oil.

\* \* \* \* \*